United States Patent
Kroepfl et al.

(10) Patent No.: US 8,284,250 B2
(45) Date of Patent: Oct. 9, 2012

(54) DETERMINING TRIGGER RATE FOR A DIGITAL CAMERA

(75) Inventors: Michael Kroepfl, Redmond, WA (US); Joachim Bauer, Graz (AT); Gerhard Neuhold, Naas (AT); Stefan Bernögger, Graz (AT); Gur Kimchi, Bellevue, WA (US); John Charles Curlander, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 12/354,787

(22) Filed: Jan. 16, 2009

(65) Prior Publication Data

US 2010/0182430 A1 Jul. 22, 2010

(51) Int. Cl.
*H04N 7/18* (2006.01)
*H04N 5/228* (2006.01)

(52) U.S. Cl. ............... 348/148; 348/159; 348/222.1; 348/E05.031; 396/263

(58) Field of Classification Search .................. 348/148, 348/159, 222.1, E5.031; 396/263
See application file for complete search history.

(56) References Cited

U.S. PATENT DOCUMENTS

| | | | | |
|---|---|---|---|---|
| 5,535,144 A * | 7/1996 | Kise | ................ | 702/158 |
| 5,650,944 A * | 7/1997 | Kise | ................ | 700/304 |
| 6,009,359 A | 12/1999 | El-Hakim et al. | | |
| 6,396,397 B1 * | 5/2002 | Bos et al. | ................ | 340/461 |
| 7,088,387 B1 * | 8/2006 | Freeman et al. | ............. | 348/155 |
| 7,127,348 B2 | 10/2006 | Smitherman et al. | | |
| 7,363,157 B1 | 4/2008 | Hanna et al. | | |
| 2004/0227814 A1 * | 11/2004 | Choi | .................. | 348/148 |
| 2005/0083432 A1 * | 4/2005 | Honda et al. | .............. | 348/362 |
| 2005/0128314 A1 * | 6/2005 | Ishino | ................ | 348/222.1 |
| 2006/0232702 A1 * | 10/2006 | Joskin et al. | ............... | 348/362 |
| 2006/0256198 A1 * | 11/2006 | Nishiuchi | ............... | 348/148 |

FOREIGN PATENT DOCUMENTS

WO    2005036199 A2    4/2005
WO    2008054203 A1    5/2008

OTHER PUBLICATIONS

Madeira, et al., "Low Cost Mobile Mapping System for Urban Surveys", Retrieved at <<http://www.fig.net/commission6/lisbon_2008/papers/pst02/pst02_13 madeira_mc114.pdf>>, LNEC, Lisbon 2008, May 12-15, pp. 12.
Ooishi, et al., "Development of Simple Mobile Mapping System for the Construction of Road Foundation Data", Retrieved at <<http://www.cartesia.org/geodoc/isprs2004/comm2/papers/100.pdf>>, pp. 6.

(Continued)

Primary Examiner — Peling Shaw
Assistant Examiner — Thomas Richardson

(57) ABSTRACT

A system that facilitates determining a trigger rate for a digital camera to provide a threshold forward overlap for consecutively captured images is described herein. The system includes a receiver component that receives first data pertaining to a distance between the digital camera and a surface. The system additionally includes a rate determiner component that is in communication with the receiver component, wherein the rate determiner component determines the trigger rate for the digital camera based at least in part upon the first data, wherein the trigger rate is indicative of an amount of time between consecutive images captured by the digital camera.

17 Claims, 12 Drawing Sheets

OTHER PUBLICATIONS

Tao, Chuang Vincent, "Innovations on Multi-Sensor and Multi-Platform Integrated Data Acquisition", Retrieved at <<http://www.digitalearth-isde.org/cms/upload/2007-04-30/1177912619061.pdf>>, pp. 3.

Lee, et al., "Design and Implementation of 4S-VAN: A Mobile Mapping System", Retrieved at <<http://etrij.etri.re.kr/Cyber/servlet/GetFile?fileid=SPF-1149838328536>>, ETRI Journal, vol. 28, No. 3, Jun. 2006, pp. 265-274.

* cited by examiner

DETERMINING TRIGGER RATE FOR A DIGITAL CAMERA

BACKGROUND

Various mapping applications can be accessed by way of the Internet. Many of these mapping applications allow a user to review aerial images of a particular geographic region. Thus, if desired, a user can zoom in on a particular geographic region to obtain some knowledge regarding, for instance, roadways near an intended destination, surrounding buildings, amongst other information. Moreover, mapping applications can be used to provide to a user an indication of where certain types of businesses are located such as restaurants, shopping centers, etc. Furthermore, many mapping applications can provide the user with driving directions between a first location and a second location, and can provide the user with visual information pertaining to the route between the first location and the second location.

Some of these mapping applications are being adapted to provide even more granular information. For instance, some mapping applications are being adapted to include photographs of geographic regions such as particular cities from street-level. Thus, a user can provide a particular location (e.g., an address) to the mapping application, and the mapping application can be configured to provide the user with a three-dimensional representation of buildings pertaining to the address. Such a three-dimensional representation can include images of facades of buildings, for example, wherein the images are obtained by mounting a digital camera on an automobile and capturing images as the automobile traverses through the city.

To allow for automatic three-dimensional reconstruction from captured images, a minimum forward overlap between images is required. For instance, such minimum overlap may be between 20 and 90 percent. In another example, the minimum overlap may be between 60 and 80 percent. To ensure such overlap, conventional techniques for obtaining images have included taking images at a defined, relatively high frequency. While this approach can ensure the requisite overlap, it may result in obtaining a substantially greater amount of data than is needed to generate the three-dimensional representation of a building, street, etc. Such a substantial amount of data can render processing of such data tenuous and computationally intensive. Another conventional mechanism for ensuring the requisite overlap is using a GPS sensor to cause the digital camera to obtain images at predefined distance intervals. More particularly, the digital camera is triggered based on a position measurement from a global positioning system. This approach can fail, however, where GPS reception is suboptimal, which can often occur in congested cities due to buildings blocking GPS satellites.

SUMMARY

The following is a brief summary of subject matter that is described in greater detail herein. This summary is not intended to be limiting as to the scope of the claims.

Various technologies pertaining to determining a trigger rate for a digital camera mounted on a moving vehicle (e.g., a vehicle in transit) are described in detail herein. In an example, the digital camera may be mounted on an automobile and configured to capture images of building facades as the automobile traverses a street or streets. In an example, a minimum forward overlap of between 60 and 80 percent with respect to consecutively captured images can be predefined. A trigger rate that would provide such a desired forward overlap can be ascertained based at least in part upon a determined distance between the digital camera and a surface that is desirably imaged by the digital camera. Further, the trigger rate for the digital camera can be determined based at least in part upon a sensed or derived velocity of the vehicle. In still yet another example, the trigger rate can be determined based at least in part upon a sensed or derived angular velocity of the vehicle.

An example system described herein can include numerous data sources/sensors that are mounted to a moving vehicle. The example system may also include at least one digital camera that is configured to capture images of a surface or surfaces, such as building facades. For instance, the example system can include a laser measurement system or other suitable sensor that can detect a distance between a surface that is desirably captured by the digital camera and the digital camera. The system may also include an odometer or velocity sensor that can be employed in connection with determining velocity of the vehicle. Still further, the system may include an inertial navigation system that can be utilized to determine angular velocity of the vehicle. The laser measurement system can output distances from the digital camera to the surface for numerous ranges of degrees along the surface. These distances can be analyzed and a minimum distance can be selected. The trigger rate for the digital camera may then be ascertained based at least in part upon the selected minimum distance. Furthermore, as noted above, velocity as determined by the odometer and/or angular velocity as determined by the inertial navigation system can be used in connection with determining the trigger rate for the camera.

The determined trigger rate can be updated dynamically, as distance between the digital camera and a building façade can change. Thus, as the digital camera becomes closer or further away from building facades, the trigger rate can be dynamically updated to provide the desired forward overlap. Furthermore, the trigger rate can be dynamically updated as the vehicle turns (e.g., turns from one street to another street) such that the desired forward overlap between images is maintained as the vehicle turns.

Other aspects will be appreciated upon reading and understanding the attached figures and description.

DETAILED DESCRIPTION

Figure 1:
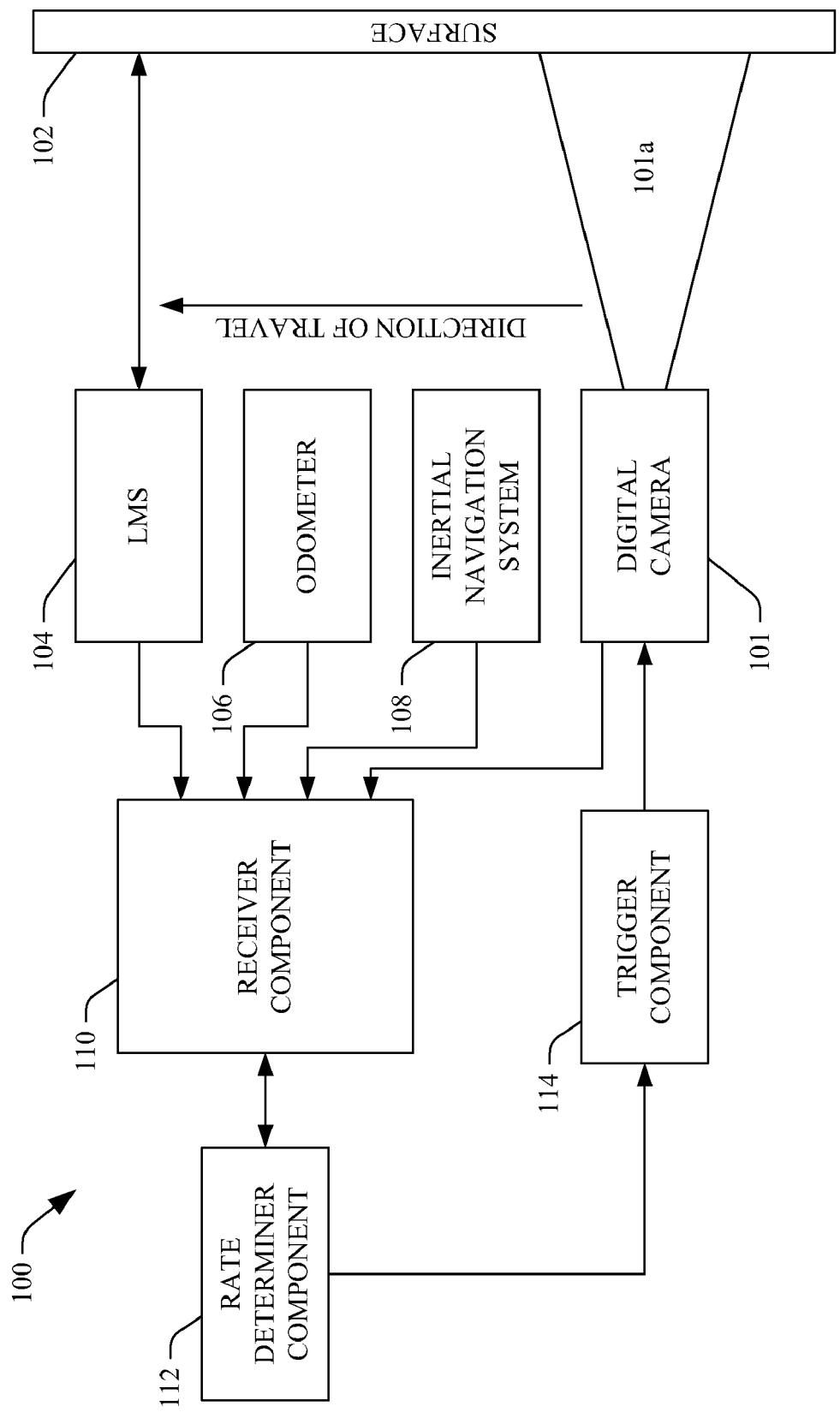
FIG. 1 is a functional block diagram of an example system that facilitates dynamically determining a trigger rate for a digital camera.

Various technologies pertaining to determining a trigger rate for a digital camera on a moving vehicle to provide a desired forward overlap will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates determining a trigger rate for a digital camera mounted on a moving vehicle is illustrated. The system 100 includes a digital camera 101 that is configured to capture images of a surface 102. For instance, the surface 102 may be a building façade or building facades, may be the ground from an airplane, etc. The digital camera 101 can be configured to capture images in a particular field of view 101*a*. It may be desirable that images consecutively captured by the digital camera 101 have a predefined forward overlap, such as between 60 and 80 percent; that is, between 60 and 80 percent of content of consecutively captured images will be shared between the consecutively captured images. Such forward overlap may be desirable in connection with automatically generating a three-dimensional representation of an object with the surface 102. Pursuant to an example the digital camera 101 can have a frame rate between 5 and 29 images per second.

The system 100 additionally includes a plurality of sensors/data sources that can be configured to output parameters pertaining to the surface 102 and/or velocity/angular velocity of a vehicle upon which the system 100 is mounted. For instance, the system 100 can include at least one laser measurement system (LMS) 104 that can be configured to output first data that is indicative of a distance between the laser measurement system 104 and the surface 102. While FIG. 1 illustrates the laser measurement system 104 as being directed perpendicularly to the surface 102, it is to be understood that the laser measurement system 104 can be configured to be directed at any suitable angle with respect to the surface 102. Furthermore, the laser measurement system 104 can be replaced with another suitable sensor that can output data that is indicative of a distance between the surface 102 and the system 100.

The system 100 may additionally include an odometer 106 that can output second data that is indicative of linear velocity of the vehicle upon which the system 100 is mounted. Again the odometer 106 may be replaced or augmented by a different sensor that can output velocity data.

The system 100 may also include an inertial navigation system 108 that can output third data that is indicative of an angular velocity of the vehicle upon which the system 100 is mounted. More particularly, the inertial navigation system 108 can output information pertaining to a rate at which the vehicle is turning (e.g., if the vehicle is on a curved roadway, if the vehicle is turning from a first street to a second street, etc.).

The system 100 can further include a receiver component 110 that can receive the first data output by the laser measurement system 104. As shown, the receiver component 110 may also optionally receive the second data output by the odometer 106 and/or the third data output by the inertial navigation system 108.

A rate determiner component 112 can be in communication with the receiver component 110, and can determine a trigger rate for the digital camera 101, wherein the trigger rate can provide a predefined desired forward overlap with respect to consecutively captured images. Furthermore, the rate determiner component 112 can determine the trigger rate that will provide the desired predefined forward overlap based at least in part upon the second data output by the odometer 106. In yet another example, the rate determiner component 112 can determine the trigger rate that will provide the desired predefined forward overlap based at least in part upon the third data output by the inertial navigation system 108.

The system 100 can further include a trigger component 114 that can cause the digital camera 101 to capture images in accordance with the trigger rate determined by the rate determiner component 112. For instance, the trigger component 114 can transmit trigger signals to the digital camera 101 in accordance with the trigger rate determined by the rate determiner component 112.

The rate determiner component 112 can dynamically update the trigger rate as conditions pertaining to the system 100 change. For instance, the system 100 may be configured to capture images of building facades, wherein such images are desirably employed in connection with automatically generating a three-dimensional representation of a particular geographic region (e.g., a city, a street, a building). If, for instance, the speed of the vehicle alters (e.g., the vehicle comes to a stop), the rate determiner component 112 can dynamically update the trigger rate based at least in part upon speed output by the odometer 106. In another example, the digital camera 101 may be capturing images of a first building that is relatively proximate to the system 100 and thereafter may be capturing images of a second building that is less proximate to the system 100. Accordingly, a distance between the building facades and the system 100 can change. The rate determiner component 112 can dynamically update the trigger rate to account for such changes in distance.

The receiver component 110 can additionally receive images captured by the digital camera 101 and can cause such images to be stored. Thus, the receiver component 110 may be a serial interface on a computing device, may be a data repository, software corresponding to a serial interface and/or a data repository, etc.

Figure 2:
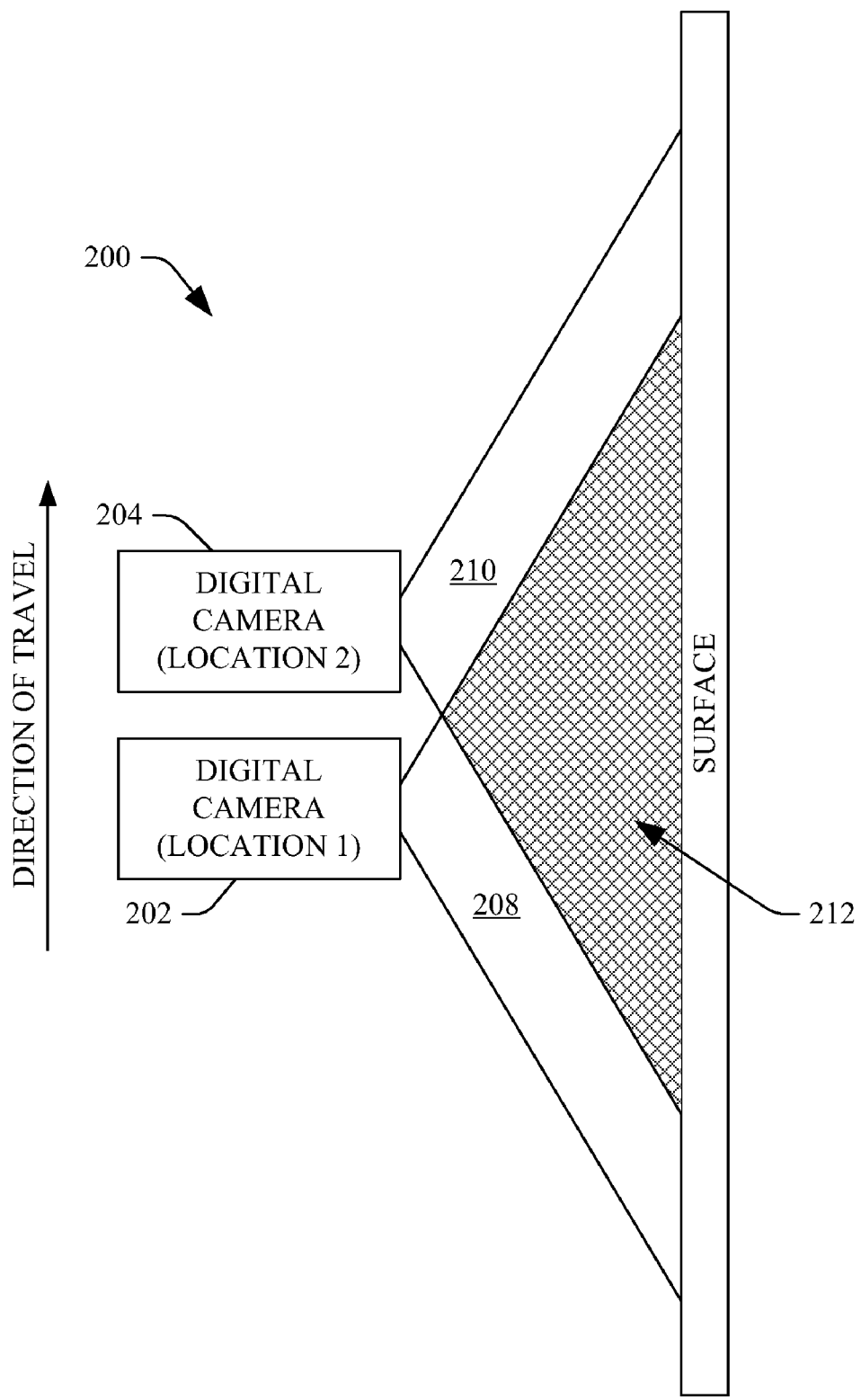
FIG. 2 is an example graphical depiction of forward overlap between consecutively captured images.

With reference now to FIG. 2, an example depiction 200 of a digital camera capturing images with a predefined desired forward overlap is illustrated. A digital camera at a first location 202 and the digital camera at a second location 204 can be configured to capture images of a surface 206 such that consecutively captured images have a desired predefined forward overlap. More particularly, the digital camera at the first location 202 can capture an image with a first field of view 208. The digital camera at the second location 204 can capture a second image with a field of view 210. The overlap of the consecutively captured images is shown as the shaded region 212. As noted above, automatic generation of a three-dimensional representation of a building, for example, may require a particular threshold amount of forward overlap (e.g., in the order of 60 to 80 percent).

As noted above, an amount of forward overlap can depend on various factors including but not limited to, velocity of a vehicle upon which the digital camera is mounted, distance along a direction of travel between images being captured, angular velocity of the vehicle upon which the digital camera is mounted, and/or distance between the digital camera and the surface 206. However, for instance, if the digital camera is configured to capture images of building facades, distance between the camera and building facades can change (e.g., different buildings may be set back at different lengths from the street, the vehicle upon which the digital camera is mounted may change lanes, etc.). As noted above, the rate determiner component 112 can utilize a measured distance between the digital camera at the first and second locations 202 and 204, respectively, and the surface 206 in connection with determining a trigger rate for the digital camera.

Figure 3:
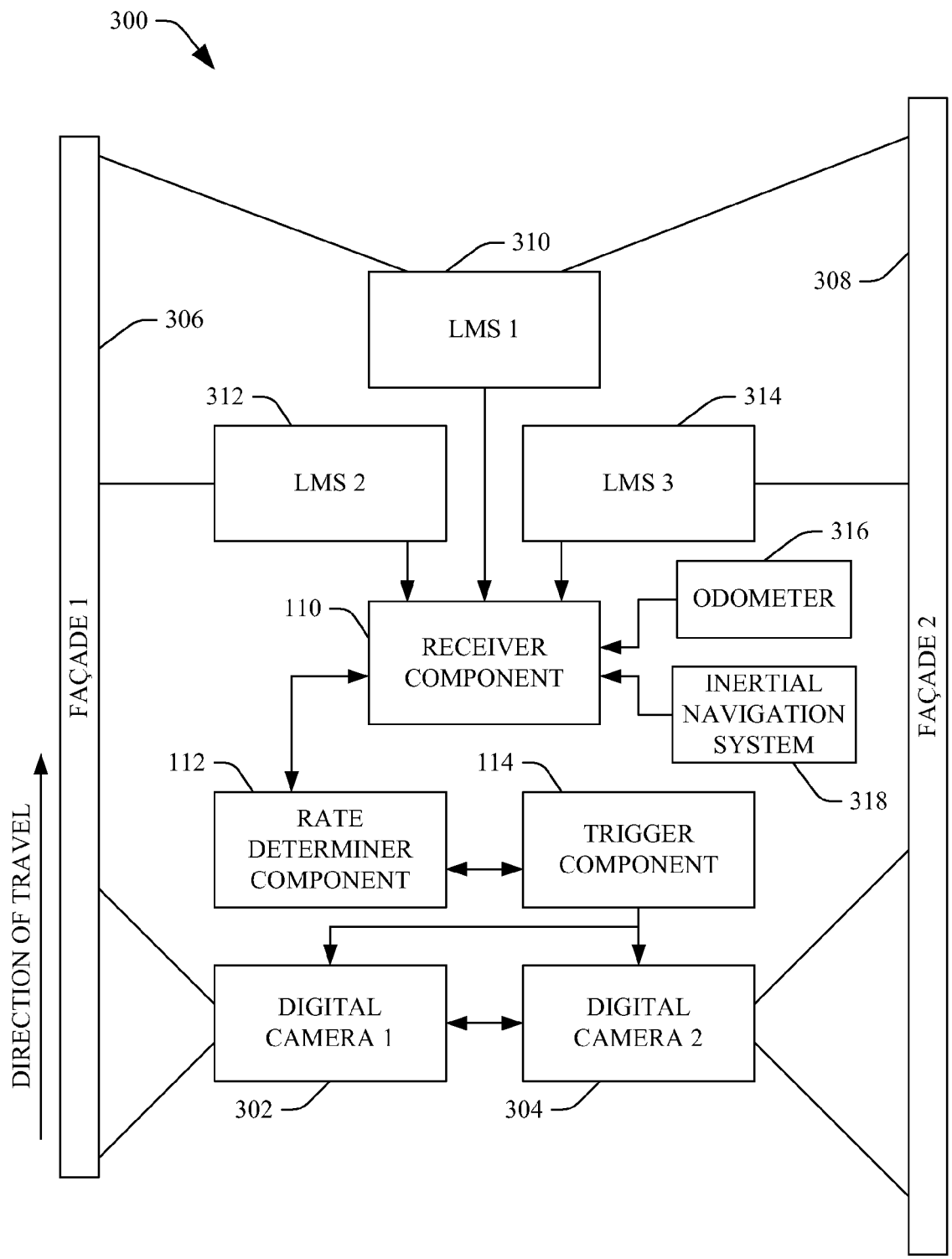
FIG. 3 is a functional block diagram of an example system that facilitates determining a trigger rate for a plurality of digital cameras.

Referring now to FIG. 3, an example system 300 that facilitates capturing images for automatically generating a three-dimensional representation of a geographic region, wherein the images are captured in accordance with a determined trigger rate, is illustrated. The system 300 includes a first digital camera 302 and a second digital camera 304. The first digital camera 302 and the second digital camera 304 may be mounted upon a vehicle, such as an automobile, that is traveling over a street. The first digital camera 302 can be configured to capture images of a first façade 306 on a first side of a street and the digital camera 304 can be configured to captures images of second building facades on a second side of the street (e.g., opposite the first side of the street). The digital cameras 302 and 304 are desirably configured to capture consecutive images with a predefined threshold overlap as the vehicle upon which the digital cameras 302 and 304 are mounted traverses the street.

The system 300 can additionally include at least three laser measurement systems 310, 312 and 314 respectively. The first laser measurement system 310 can be configured to scan for surfaces over a 180 degree range in the x, y plane (e.g., parallel to the ground). Data output by the first laser measurement system 310 can be filtered such that data pertaining to one or more ranges of the laser measurement system 310 is analyzed while data outside of such ranges is discarded. For instance, the first laser measurement system 310 can have a resolution of one degree and can output data that is indicative of distance between the first laser measurement system 310 and any suitable surface for each degree between 0 degrees and 180 degrees. In the sample system 300, however, it may be desirable to receive data pertaining to building facades 306 and 308, such that surfaces directly in front of the laser measurement system 310 are not germane to automatic generation of a three-dimensional representation. Thus, data output by the laser measurement system 310 can be filtered such that, for instance, data captured by the laser measurement system 310 between 15 degrees and 35 degrees and between 145 degrees and 165 degrees is analyzed. Still further, it may be desirable to decrease resolution by grouping or binning a range of values. For instance, while the resolution of the first laser measurement system 310 may be one degree, to decrease requisite computation, such resolution can be decreased by binning data for every 5 degrees. Data values within bins can be averages, the median can be found to remove outliers or other processing may be undertaken.

The second laser measurement system 312 and the third laser measurement system 314 can be configured to scan in the y,z plane (e.g., perpendicular to the ground). As with the first laser measurement system 310, the second and third laser measurement system 312 and 314 can have a 180 degree scan range. Again, however, since the cameras 302 and 304 are desirably configured to capture images of the building facades 306 and 308, only a subset of such range can be used in connection with generating three-dimensional representations of buildings. Accordingly, data output by the first laser measurement system 312 and the second laser measurement system 314 can be filtered such that a range of 45 degrees is captured (e.g., 0 to 45 degrees for the first laser measurement system 312 and 135 degrees to 180 degrees for the third laser measurement system 314). Similarly, the second and third laser measurement systems 312 and 314 may have resolution of 1 degree. Therefore, as described above with respect to the laser measurement system 310, output data can be binned into a bin of data with respect to certain ranges (e.g., a window size of 9 degrees such that 5 bins are created for each of the second laser measurement system 312 and the third laser measurement system 314).

The system 300 may additionally include an odometer 316 that can be used to output data indicative of a velocity of the vehicle upon which the system 300 is mounted. The odometer 316 may also be utilized to output data indicative of distance travelled in the direction of travel of the system 300.

System 300 may further include an inertial navigation system 318 that can output data indicative of angular velocity of the vehicle upon which the system 300 is mounted. The receiver component 110 can receive data from the first, second and third laser measurement systems 310-314 respectively, data from the odometer 316, as well as data from the inertial navigation system 318. As noted above, the receiver component 110 may be a data repository, computing device, a serial interface or other suitable component.

The rate determiner component 112 can be in communication with the receiver component 110 and can receive data from the laser measurement systems 310-314, the odometer 316 and the inertial navigation system 318. As will be described in greater detail below, the rate determiner component 112 can perform various filtering operations on data received from the laser measurement systems 310-314, the odometer 316 and/or the inertial navigation system 318 in connection with determining a trigger rate for the digital cameras 302-304. The trigger rate determined by the rate determiner component 112 can provide a desired amount of forward overlap for consecutively captured images by the first digital camera 302 and the second digital camera 304.

The trigger component 114 can receive the trigger rate determined by the rate determiner component 112 and can configure the digital cameras 302 and 304 to capture images in accordance with the determined trigger rate. Pursuant to an example, the rate determiner component 112 can determine a trigger rate individually for each of the digital cameras 302 and 304, and the trigger component 114 can configure the digital cameras 302 and 304 separately with different trigger rates. In another example, the rate determiner component 112 can determine a trigger rate that provides at least a desired amount of forward overlap for one of the cameras and the trigger component 114 can configure both cameras with the determined trigger rate. In such a case, one of the digital cameras 302 or 304 may have a forward overlap that is greater than the threshold minimum forward overlap.

Figure 4:
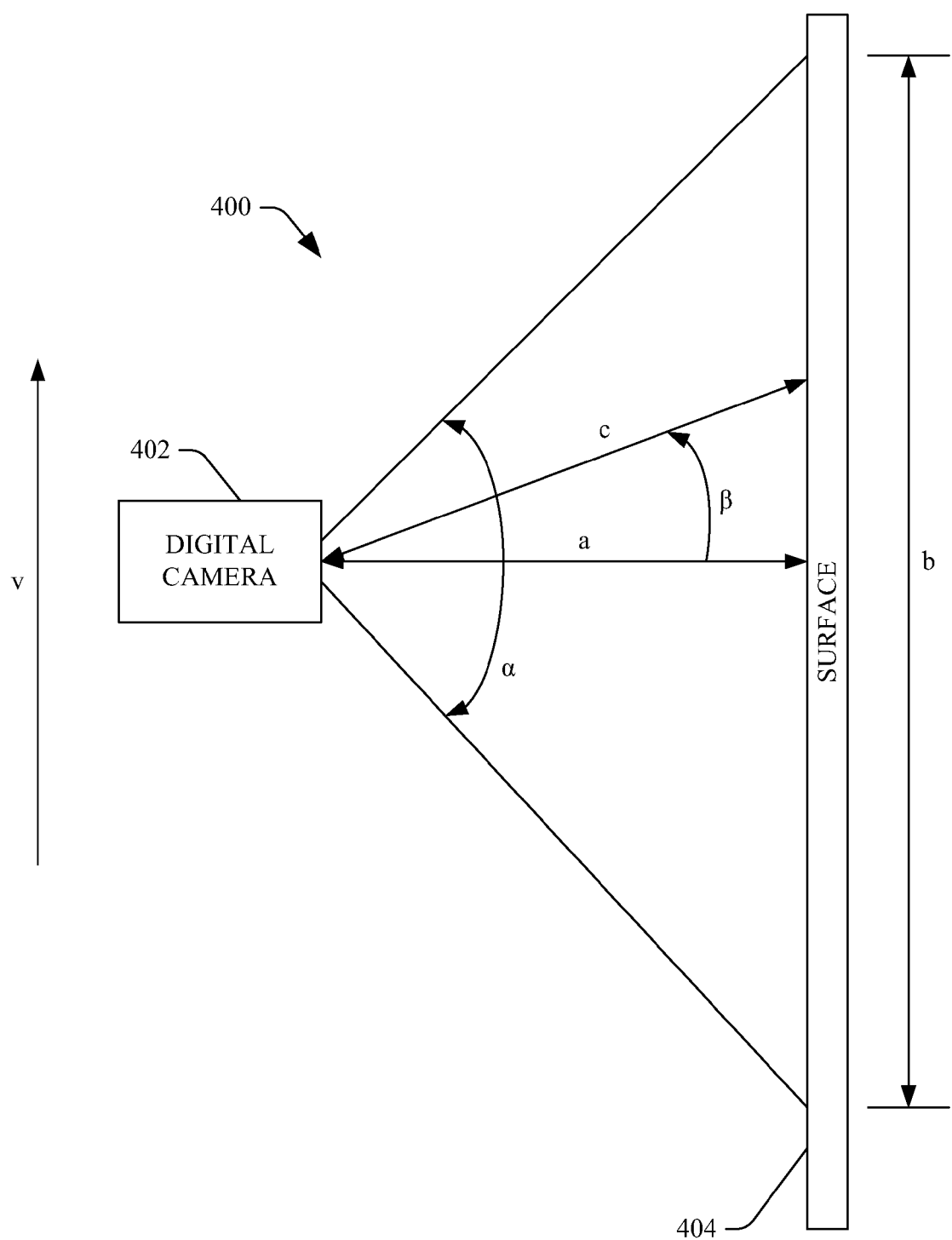
FIG. 4 is an example depiction of a field of view of a digital camera.

With reference now to FIG. 4, an example depiction 400 of a digital camera capturing an image of a surface such as a building façade is illustrated. The example depiction 400 includes a digital camera 402 that is configured to capture images of a surface 404. The digital camera 402 may capture images with an angle of view of α. This angle of view may be known based upon parameters of the digital camera 402. The digital camera 402 may be at a normal distance a to the surface 404. Given the normal distance a and the angle of view α, a field of view b along the surface 404 can be ascertained. A laser measurement system, such as the laser measurement system described above, can be configured to capture a distance measurement c which is at an angle β from a. Furthermore, the digital camera 402 (and other system components) can be traveling at a velocity v in the direction indicated in FIG. 4. The variables depicted in FIG. 4 can be used by the rate determiner component 112 to determine a trigger rate for the digital camera 402.

Figure 5:
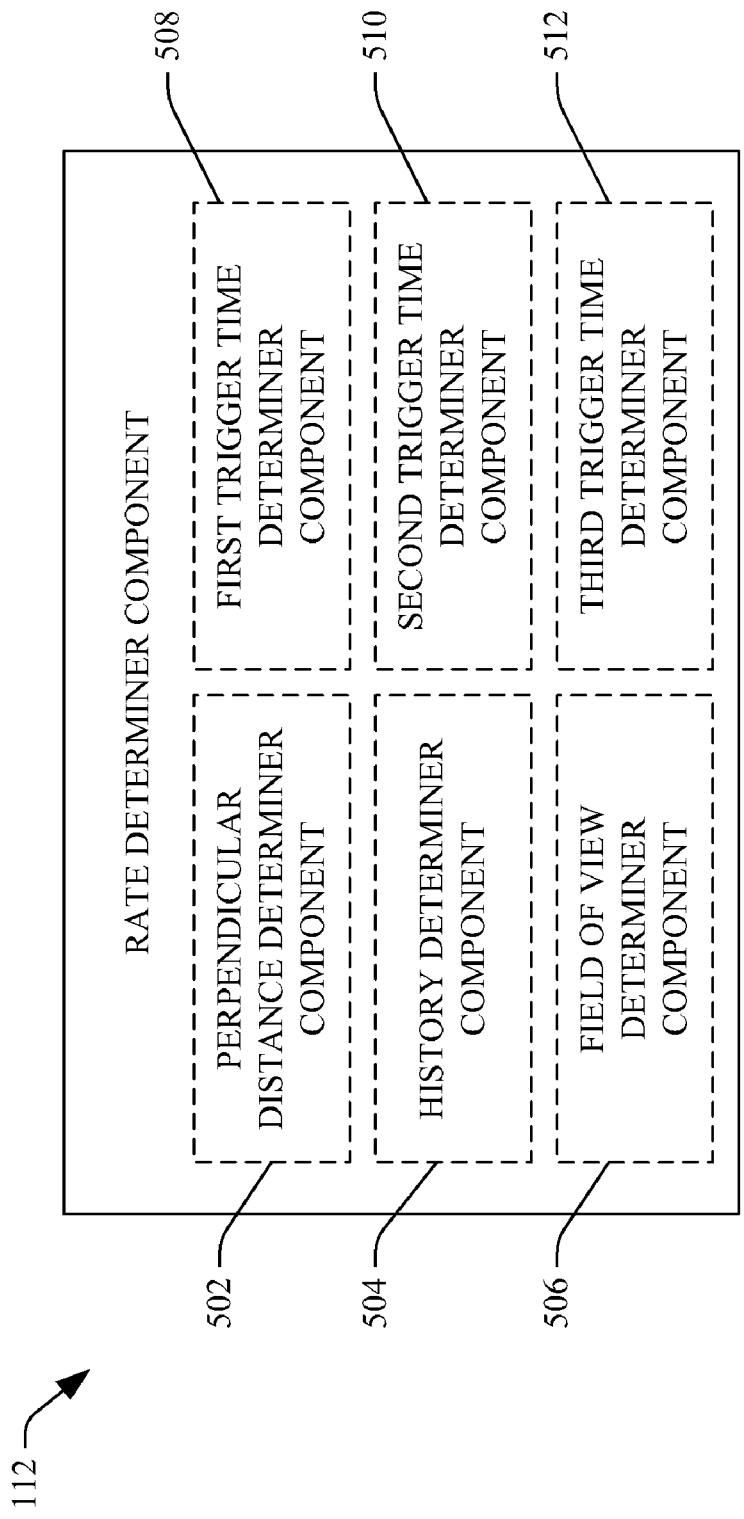
FIG. 5 is a functional block diagram of an example rate determiner component.

Now referring to FIG. 5, an example depiction of the rate determiner component 112 is illustrated. The rate determiner component 112 may include a perpendicular distance determiner component 502 that can determine perpendicular distances from, for instance, the digital camera 304 to the façade 308. Perpendicular distances can be determined for a current location as well as a future location along the direction of travel of a vehicle upon which the system 300 is mounted. For instance, as noted above, a laser measurement system can be configured to scan horizontally along the direction of travel of the system 300. More particularly, the detection of the distance from the digital cameras 302 and 304 from the facades 306 and 308, respectively, can be calculated based at least in part upon data output by the three laser measurement systems 310-314 (e.g., horizontally oriented, vertically oriented on the left side of the system and vertically oriented on the right side of the system). Each of the laser measurement systems 310-314 can output a series of measured values, out of which a sub-range can be used for determining the trigger rate. Example sub-ranges have been described above. The perpendicular distance determiner component 502 can utilize the algorithm a=c*cos β in connection with determining perpendicular distances with respect to the current location (e.g., found by analyzing the horizontal left and right laser measurement systems 312 and 314, respectively) as well as perpendicular distances for future locations determined through use of data output by the laser measurement system 310 oriented horizontally.

A plurality of windows can be defined in each of the sub-ranges corresponding to the laser measurement systems 310-314. For instance, as noted above, a sub-range corresponding to the laser measurement system 314 may be 135 degrees to 180 degrees. Furthermore, the laser measurement system 314 may have a resolution of 1 degree, such that the laser measurement system 314 outputs values for each degree. Thus, the laser measurement system 314 can output 180 values during one scan while only 45 of such values are used (corresponding to degrees 135 to 180). Accordingly, the perpendicular distance determiner component 502 can determine 45 separate perpendicular distances for each scan of the laser measurement system 314. These 45 values may be further grouped into windows, such as 5 degree windows, 9 degree windows, etc. Thus, if the window size is defined as being 9 degrees, five windows will exist, each including nine perpendicular distances determined by the perpendicular distance determiner component 502. Filtering may then be undertaken with respect to data in each window such that a median value in each of the windows is selected (e.g., to remove outliers). Accordingly, given a resolution of 1 degree, a sub-range of 45 degrees and a window size of 9 degrees, 5 perpendicular distance values can be generated, wherein such distance values are the median distance values in the windows of distance values.

The filtered perpendicular distance measurements determined by the perpendicular distance determiner component 502 can be rounded in accordance with a predefined bin width (e.g., 50 centimeters). Thus, for instance, a particular bin range may be 20 meters to 20.5 meters and accordingly, if a perpendicular distance is between 20 meters and 20.5 meters, such distance value will be placed in the appropriate bin. The histogram may then be analyzed and the highest peak in the histogram can be selected as being the minimum distance.

Figure 6:
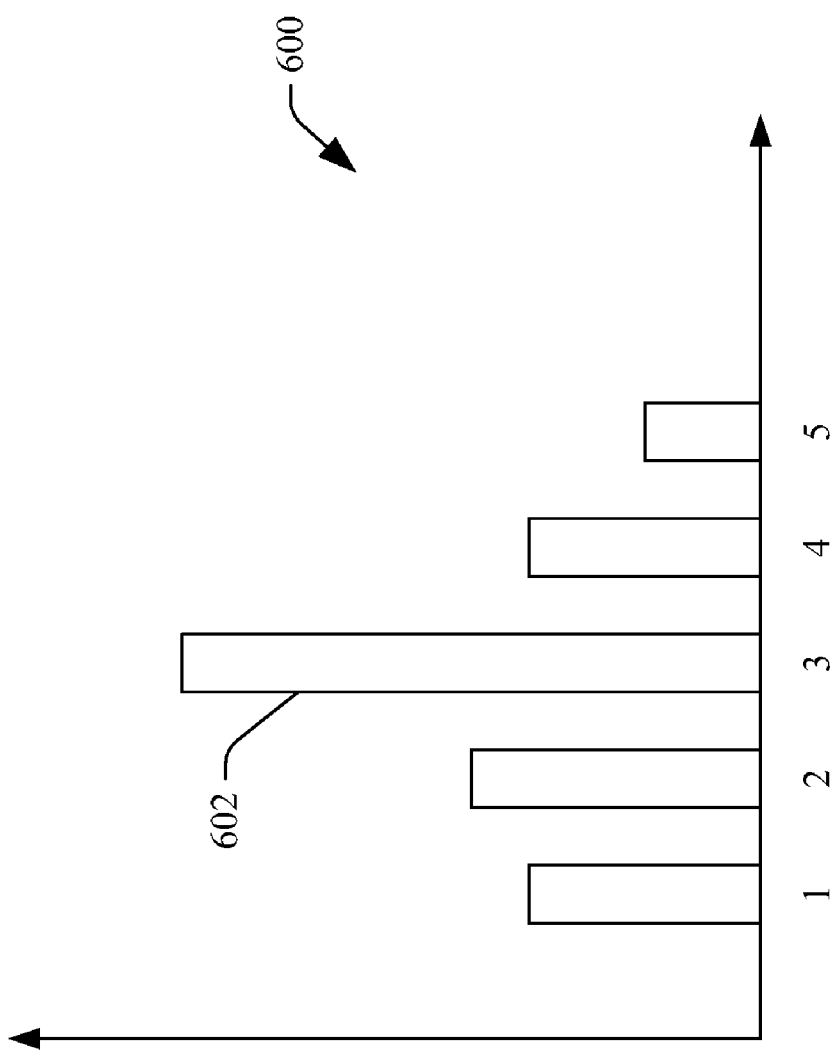
FIG. 6 is an example depiction of a histogram.

Referring briefly to FIG. 6, an example histogram 600 is depicted. The histogram 600 includes five histogram bins. As can be discerned, the third range includes the greatest number of perpendicular distances determined by the perpendicular distance determiner component 502 for at least one scan of one of the laser measurements systems 310-314. Thus, the range represented by the third range can be the minimum distance from one of the digital cameras to one of the facades.

Returning to FIG. 5, the rate determiner component 112 can additionally include a history determiner component 504 that maintains a history of minimum values corresponding to various positions along the route traveled by a vehicle upon which the system 300 is mounted. A history generated by the history determiner component 504 can include a defined number of filtered/minimum values (e.g., selected through use of a histogram). For instance, the history can include a minimum value for each threshold amount of distance traveled (as determined by the odometer 316). Pursuant to a particular example, a minimum value can be added to the history for each 50 centimeters traveled by the vehicle upon which the system 300 is mounted. If more than one minimum value exists within a threshold distance traveled, such values can be averaged and stored as the history value for a particular location. Furthermore, as noted above, the system 300 can include the first laser measurement system 310 that scans in a direction of travel of a vehicle upon which the system 300 is mounted. Accordingly, minimum values for future locations can be predicted and included in the history. As the vehicle upon which the system 300 is mounted continues to move in the direction of travel, the history values ascertained from data output by the forward oriented laser measurement system 310 can be overwritten by minimum values determined through use of the laser measurement systems 312-314, which are configured to scan orthogonally to the direction of travel of the vehicle upon which the system 300 is mounted. Thus, in summary, the history determined by the history determiner component 504 can include a plurality of minimum perpendicular distance values for a threshold range of distance traveled both in the forward, orthogonal and reverse directions.

The rate determiner component 112 can additionally include a field of view determiner component 506 which can determine a field of view of the camera through use of a perpendicular distance determined by the perpendicular distance determiner component 502. For example, the field of view determiner component 506 can utilize a normal distance a such as that shown in FIG. 4. In another example, the field of view determiner component 506 can use an average of a plurality of minimum values in connection with determining the current field of view of a digital camera. In an example, the following algorithm can be used by the field of view determiner component 506 in connection with determining an approximate field of view b of the digital camera using a current distance reading from a vertically aligned laser measurement system:

$$b = \left(a \times \tan\frac{\alpha}{2}\right) \times 2.$$

Figure 7:
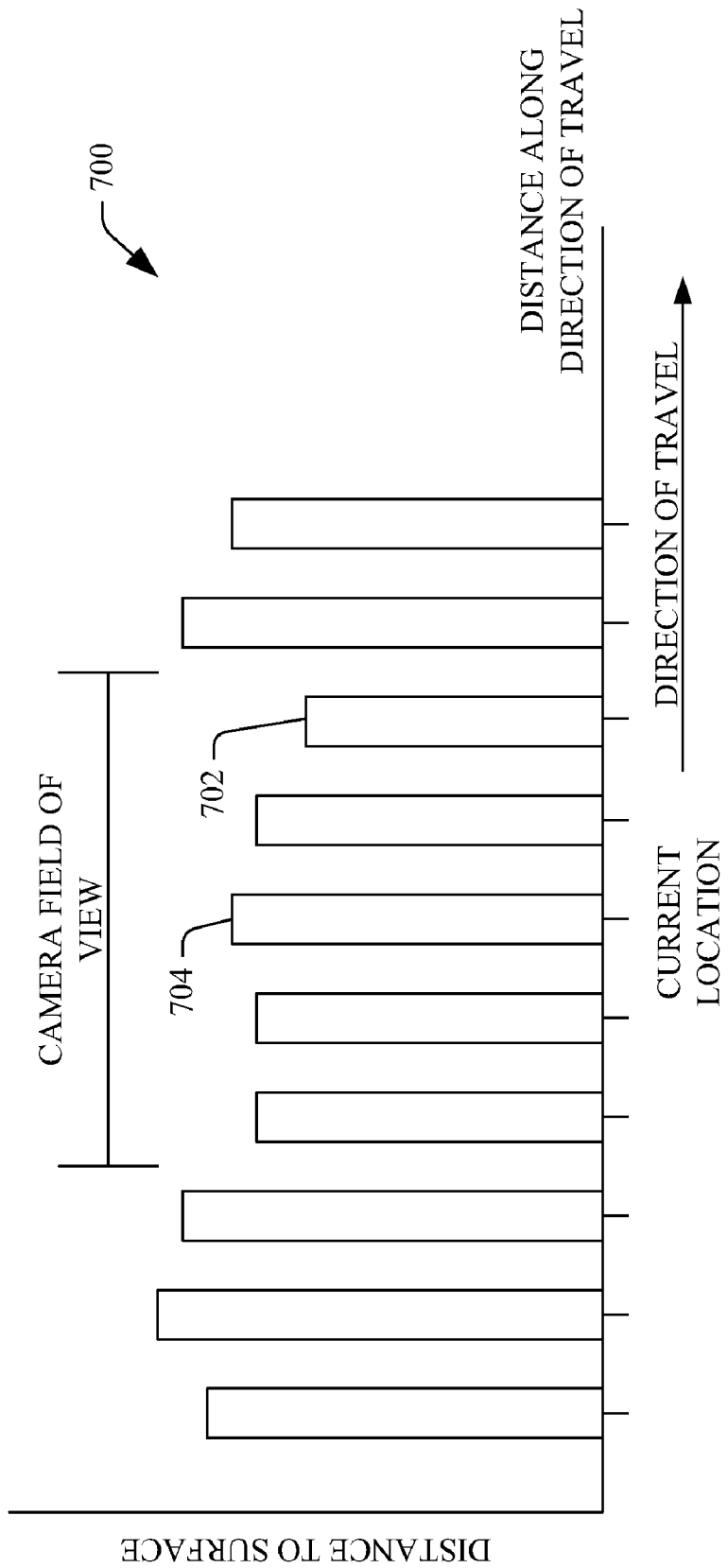
FIG. 7 is an example depiction of determined distances between a digital camera and a surface that is desirably imaged by the digital camera and the field of view of the digital camera.

Referring briefly to FIG. 7, an example history 700 that can be computed by the history determiner component 504 and the field of view determined by the field of view determiner component 506 is illustrated. As can be ascertained, the history 700 includes a plurality of minimum distances determined through use of a histogram with respect to a plurality of locations along the direction of travel. For instance, the history 700 may include a minimum distance for each one-half of a meter traveled by a vehicle upon which the system 300 is mounted. Furthermore, the history 700 can include minimum values from locations that have already been passed as well as locations that have yet to be passed. For example, the minimum value for a current location of the vehicle is represented by bar 702. Bars to the right of the bar 702 represent minimum distances for locations in front of the vehicle while bars to the left of the bar 702 represent minimum values for locations behind the vehicle. As described above, the field of view of the camera can be ascertained by using one or more of the minimum values. As shown in the history 700, the field of view of the camera includes minimum distances for five locations. To provide the predefined threshold forward overlap for images consecutively captured by the digital camera, the minimum value of the distances to the surface within the camera field of view can be selected. In this example, the minimum value can be represented by the bar 704.

Returning to FIG. 5, the rate determiner component 112 can include a first trigger time determiner component 508. For example, the first trigger time determiner component 508 can determine a trigger time (in microseconds) based at least in part upon the minimum distance in the history determined by the history determiner component 504 and a current velocity value as output by the odometer 316. For example, the following algorithm can be used by the first trigger time determiner component 508.

$$t_1 = \frac{(b*(1-e))}{v},$$

where e is the desired forward overlap.

The rate determiner component 112 can additionally include a second trigger time determiner component 510 that can calculate a trigger time based at least in part upon an angular velocity of a vehicle upon which the system 300 is mounted as output by the inertial navigation system 318. For instance, the second trigger time determiner component 510 can use the following algorithm in connection with determining a second time rate $t_2$:

$$t_2 = \frac{(\alpha*(1-e))}{\omega}.$$

The rate determiner component 112 can further include a third trigger time determiner component 512 that can compute a trigger time based at least in part upon the current velocity, the minimum distance selected from the history and the angular velocity. The trigger time output by the third trigger rate determiner component 512 can be based upon the following algorithm $t_{ges}=t_1+t_2$. The rate determiner component 112 can determine a trigger rate by taking the inverse of the trigger time determined by the third trigger time determiner component 512

$$\left(f = \frac{1}{t_{ges}}\right).$$

The rate determiner component 112 can determine a trigger rate for each camera in the system 300. Pursuant to an example, the trigger rate that provides the threshold predefined minimum overlap for each digital camera in the system 300 can be selected and the trigger component 114 can configure each of the digital cameras based at least in part upon the selected trigger rate. In another example, the rate determiner component 112 can determine a trigger rate for each of the digital cameras and each of the digital cameras can be separately configured based at least in part upon the trigger rate determined for the respective digital cameras.

Furthermore, the rate determiner component 112 can dynamically update the trigger rate as conditions surrounding the system 300 alter. For instance, the rate determiner component 112 can update the trigger rate during each scan undertaken by the laser measurement systems 310-314. Accordingly, the trigger rate of the digital cameras can be dynamically updated to provide the threshold predefined forward overlap.

With reference now to FIGS. 8-11, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 8:
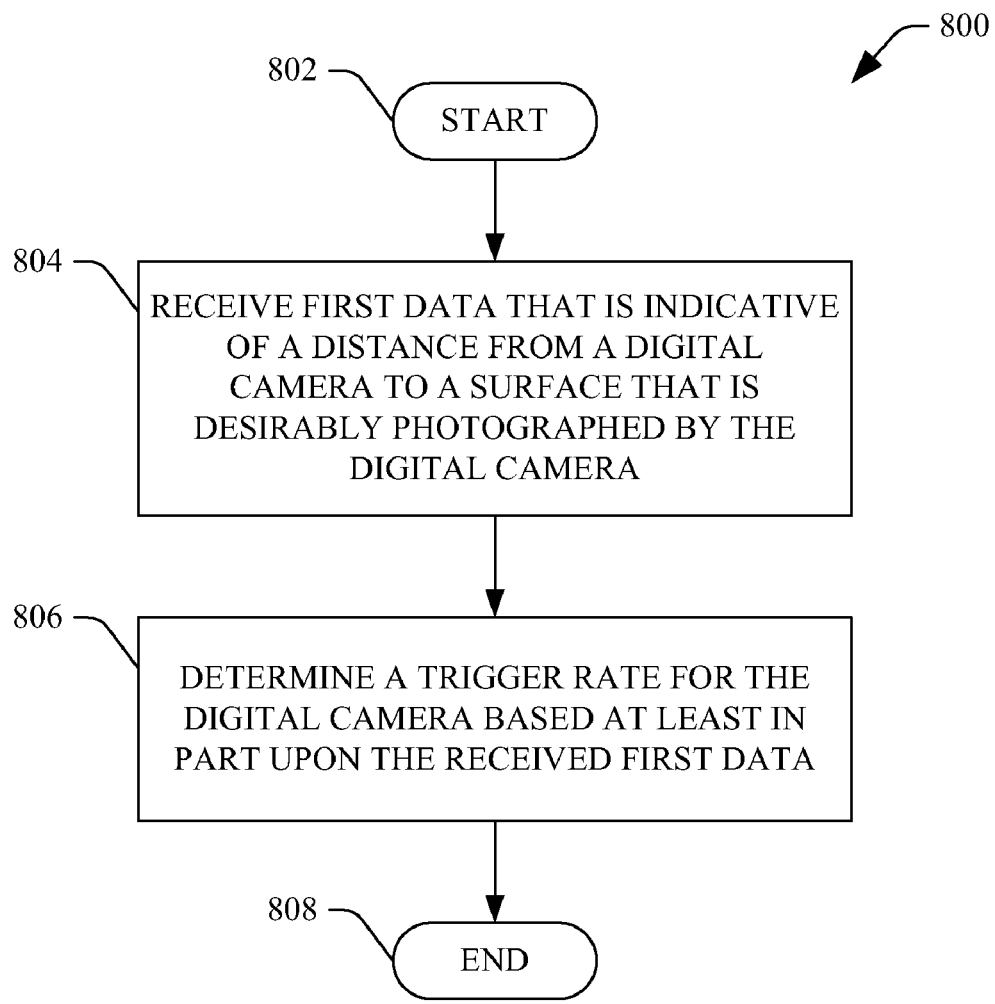
FIG. 8 is a flow diagram that illustrates an example methodology for determining a trigger rate for a digital camera.

Referring now to FIG. 8, an example methodology 800 that facilitates determining a trigger rate for a digital camera to provide a desired predefined forward overlap is illustrated. The methodology 800 begins at 802, and at 804 first data is received that is indicative of a distance from a digital camera to a surface that is desirably photographed by the digital camera. As described above, such first data can be received from a laser measurement system that is mounted proximate to a digital camera on a vehicle.

At 806, a trigger rate is determined for the digital camera based at least in part upon the received first data. As noted above, the trigger rate can control a rate at which the digital camera captures consecutive images. The methodology 800 completes at 808.

Figure 9:
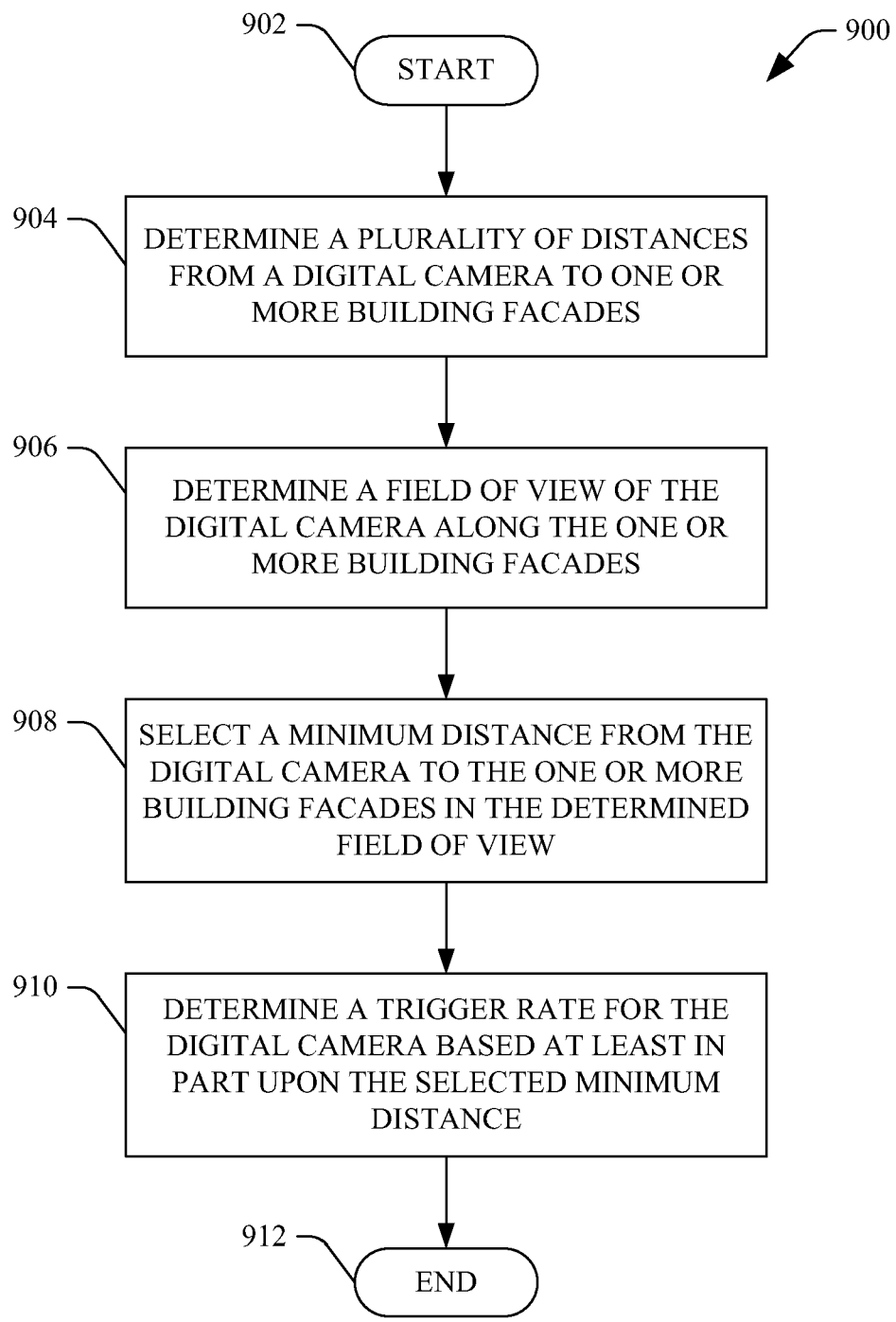
FIG. 9 is a flow diagram that illustrates an example methodology for determining a trigger rate for a digital camera.

With reference now to FIG. 9, an example methodology 900 that facilitates determining a trigger rate for a digital camera based at least in part upon data that is indicative of a distance between the digital camera and a building façade that is to be imaged by the digital camera is illustrated. The methodology 900 starts at 902, and at 904, a plurality of distances from the digital camera to one or more building facades desirably imaged by the digital camera are determined. Again, this plurality of distances can be ascertained through analysis of data output by one or more laser measurement systems mounted proximate to the digital camera.

At 906, a field of view of the digital camera is determined along the one or more building facades. Determination of the field of view b has been described above.

At 908, a minimum distance amongst the plurality of distances is selected, wherein the selected minimum distance corresponds to a minimum distance in the determined field of view.

At 910, a trigger rate for the digital camera is determined based at least in part upon the selected minimum distance. The methodology 900 completes at 912.

Figure 10:
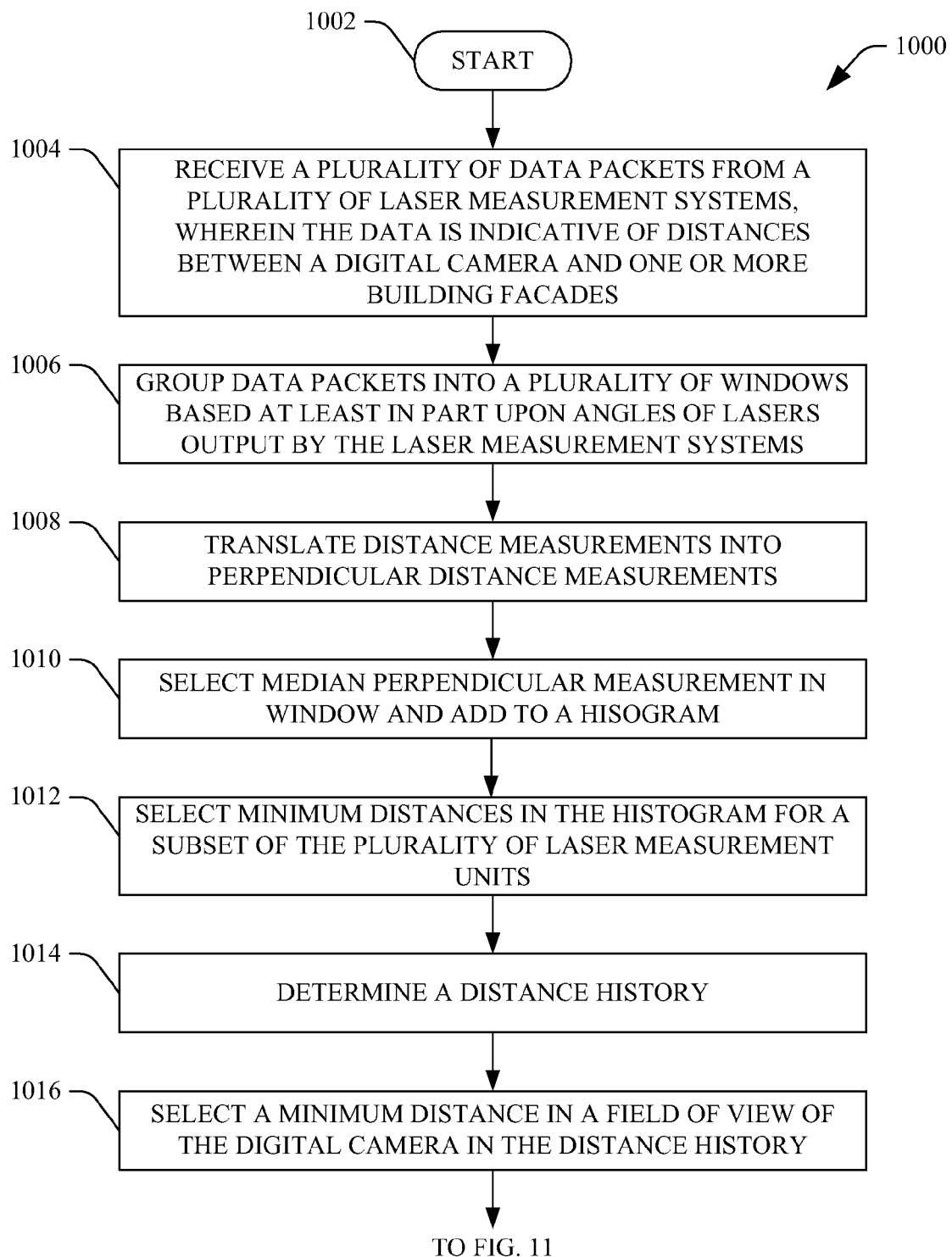
FIGS. 10 and 11 are a flow diagram that illustrates an example methodology for determining a trigger rate for a digital camera.
Figure 11:
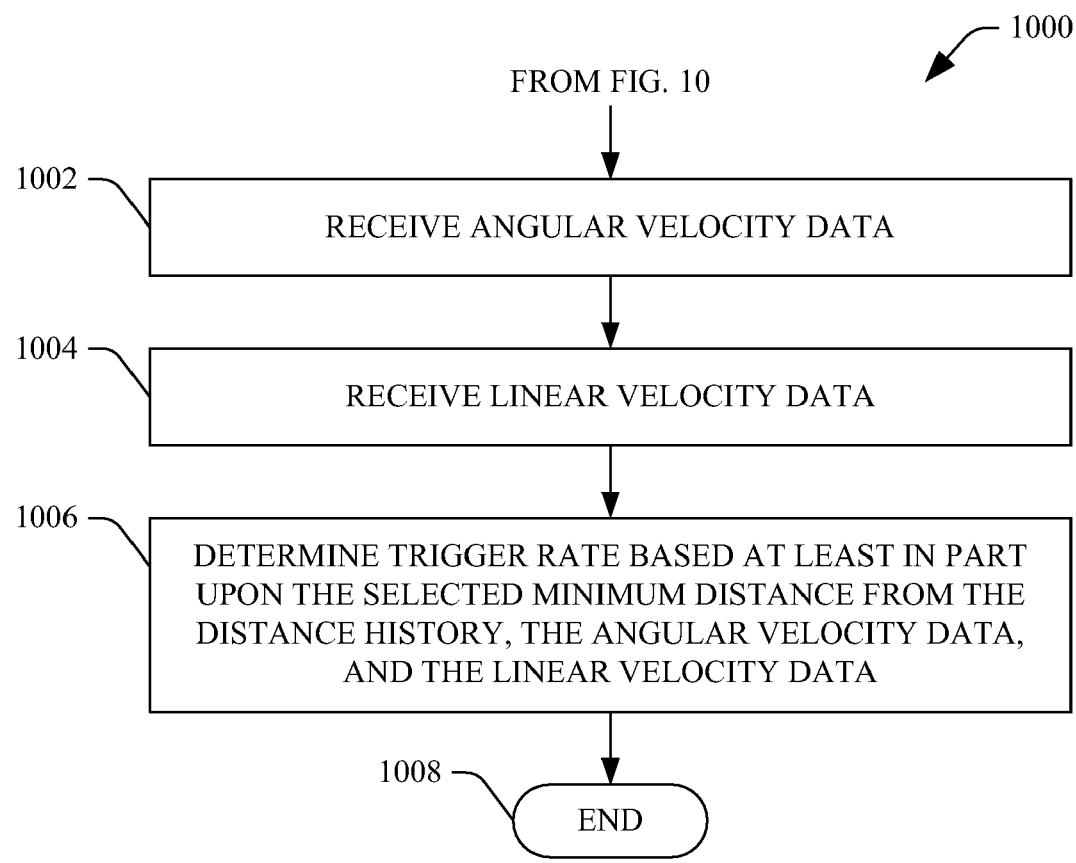

Referring now to FIGS. 10 and 11, an example methodology 1000 for determining a trigger rate for a digital camera is illustrated. The methodology 1000 starts at 1002 and at 1004 a plurality of data packets are received from a plurality of different laser measurement systems. For instance, the plurality of data packets can be indicative of perpendicular distances between a digital camera and one or more building facades. The plurality of laser measurement systems may include a first laser measurement system that is configured to scan in a horizontal plane in the direction of travel, a second laser measurement system that is configured to scan in a vertical plane on a first side that is perpendicular to the direction of travel, and a third laser measurement system that is configured to scan vertically opposite the direction of the scan of the second laser measurement system. The number of data packets received can depend upon, for instance, a resolution of the laser measurement systems.

At 1006, the plurality of received data packets are placed in predefined windows based at least in part upon angles corresponding to the data packets when the laser measurement systems perform the scan. For instance, a predefined window for a first laser measurement system may be between 0 degrees and 5 degrees. Furthermore, the laser measurement system may have a resolution of 1 degree such that the laser measurement system outputs a data packet for each degree. Thus, if the laser measurement system outputs a data packet corresponding to an angle of 3 degrees, such data packet can be placed in a window that corresponds to between 0 and 5 degrees.

At 1008, contents of the data packet are translated into perpendicular distance measurements, wherein such perpendicular distance measurements are indicative of a distance between a surface such as a building façade and the digital camera (referred to as a perpendicular distance).

At 1010, a median perpendicular distance is selected from each of the predefined windows and such median perpendicular distances are added to a histogram. As has been described above, at least one histogram can be generated for each of the laser measurement systems. In a specific example, first and second histograms can be generated with respect to the first laser measurement system which is oriented horizontally and scanned in a direction consistent with the direction of travel. For instance, the first histogram can correspond to perpendicular distances ascertained from data packets corresponding to a front left range of degrees along the direction of travel and the second histogram can correspond to laser scans on a front right range of degrees along a direction of travel. A third histogram can correspond to the second laser measurement system that scans in a vertical direction perpendicular to the direction of travel and a fourth histogram can be generated for the third laser measurement system that scans vertically in a direction opposite of the scanned direction of the second laser measurement system.

At 1012, distances in each of the histograms can be selected. Such selection can be made by locating a highest peak in the histogram, which can represent a most probable distance between the digital camera and the surface that is desirably photographed.

At 1014, a distance history is determined, wherein the distance history includes distances between one or more digital cameras and one or more building facades for a current location, previous locations and future locations (wherein the distances for the future locations can be determined through use of the horizontally oriented laser measurement system).

At 1016, a minimum distance in a field of view of one or more digital cameras in the distance history can be selected. As described, above the field of view b of the camera can be ascertained based at least in part upon a known angle of view of the digital camera and a distance between the digital camera and a surface that is desirably imaged.

At 1018, angular velocity data can be received. Such angular velocity data, for instance, can be received from an inertial navigation system as described above. At 1020, linear velocity data can be received for instance from an odometer or other suitable velocity sensor.

At 1022, a trigger rate that will provide a threshold forward overlap for consecutive images captured by the digital camera can be determined based at least in part upon the minimum distance selected at 1016, the angular velocity data received at 1018 and the linear velocity data received at 1020. The methodology 1000 completes at 1024.

Figure 12:
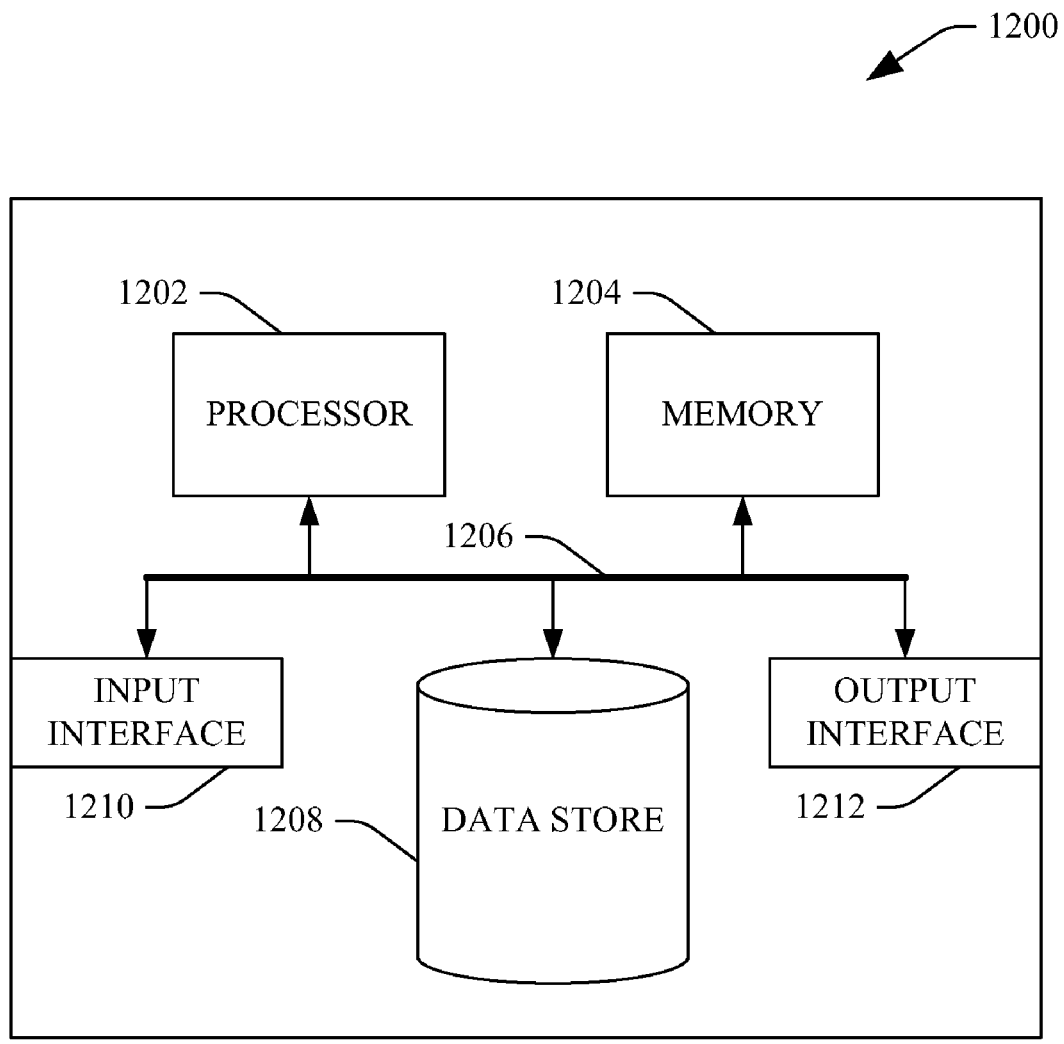
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in a system that supports determining a trigger rate for one or more digital cameras to provide a threshold forward overlap between consecutively captured images. In another example, at least a portion of the computing device 1200 may be used in a system that supports automatically generating a three-dimensional representation of a geographic region such as a building, a street, etc. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store images, angular velocity data, minimum distances between a digital camera and a façade, etc.

The computing device 1200 additionally includes a data store 1208 that is accessible by the processor 1202 by way of the system bus 1206. The data store 1208 may include executable instructions, digital images, distances between a digital camera and a facade, etc. The computing device 1200 also includes an input interface 1210 that allows external devices to communicate with the computing device 1200. For instance, the input interface 1210 may be used to receive instructions from an external computer device, data packets from one or more laser measurement systems, velocity data from an odometer or other velocity sensor, angular velocity data from an inertial navigation system, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that facilitates determining a trigger rate for a digital camera mounted to a moving vehicle, the system comprising:
   a processor; and
   a memory that comprises a plurality of components that are executed by the processor, the plurality of components comprising:
      a receiver component that receives:
         first data pertaining to a distance between the digital camera and at least one surface desirably imaged by the digital camera, the first data received from a first sensor; and
         second data that is indicative of the velocity of the moving vehicle, the second data received from a velocity sensor;
      a rate determiner component that is in communication with the receiver component, wherein the rate determiner component determines the trigger rate for the digital camera based at least in part upon the first data and the second data; and
      a trigger component that causes the digital camera to capture images in accordance with the trigger rate determined by the rate determiner component.

2. The system of claim 1, wherein the rate determiner component determines the trigger rate for the digital camera based at least in part upon a predefined desired forward overlap between consecutive images captured by the digital camera.

3. The system of claim 2, wherein the predefined desired forward overlap is between twenty percent and ninety percent.

4. The system of claim 1, further comprising a laser measurement system that generates the data pertaining to the distance between the digital camera and the surface.

5. The system of claim 4, further comprising a plurality of laser measurement systems that generates the data pertaining to the distance between the digital camera and the surface.

6. The system of claim 1, wherein the digital camera is mounted to an automobile and the surface is a building façade.

7. The system of claim 1, wherein the digital camera is mounted to a moving vehicle, and wherein the receiver component additionally receives second data indicative of angular velocity of the vehicle, and wherein the rate determiner component determines the trigger rate for the digital camera based at least in part upon the received second data.

8. The system of claim 1, wherein the digital camera is mounted to a moving vehicle, and wherein the receiver component additionally receives second data indicative of linear velocity of the vehicle and third data indicative of angular velocity of the vehicle, and wherein the rate determiner component determines the trigger rate for the digital camera based at least in part upon the received second data and the received third data.

9. The system of claim 1, wherein the trigger component causes a plurality of digital cameras to capture images in accordance with the trigger rate determined by the rate determiner component.

10. The system of claim 1, wherein the rate determiner component determines a plurality of distances from the digital camera to the surface in a field of view of the digital camera, and wherein the rate determiner component uses a minimum distance in the plurality of distances to determine the trigger rate.

11. The system of claim 1, wherein the plurality of components further comprise a field of view determiner component that determines a field of view pertaining to the digital camera, and wherein the rate determiner component determines the trigger rate for the digital camera based at least in part upon the determined field of view.

12. The system of claim 1, wherein the trigger rate is a rate at which the digital camera captures images.

13. A method for determining a trigger rate for a digital camera, comprising:
    receiving, from a first sensor, first data that is indicative of a distance from the digital camera to at least one surface that is desirably photographed by the digital camera;
    receiving, from a velocity sensor, second data that is indicative of a velocity of the digital camera, wherein the digital camera is mounted on a moving vehicle;
    determining the trigger rate for the digital camera based at least in part upon the received first data and the received second data, wherein the trigger rate is indicative of an amount of time between consecutive images captured by the digital camera; and
    configuring the digital camera to capture images in accordance with the determined trigger rate, wherein the method is executed by a processor of a computing device.

14. The method of claim 13, further comprising:
    receiving, from a second sensor, third data that is indicative of angular velocity of the vehicle; and
    determining the trigger rate for the digital camera based at least in part upon the received third data.

15. The method of claim 13, further comprising:
    determining a field of view of the digital camera; and
    determining the trigger rate for the digital camera based at least in part upon the determined field of view.

16. The method of claim 13, wherein the trigger rate is determined based at least in part upon a predefined desirable forward overlap of consecutive images captured by the digital camera.

17. A computer-readable data storage device comprising instructions that, when executed by a processor, cause the processor to perform acts comprising:
    determining, based upon data received from a first sensor, a distance between at least one surface desirably photographed and a digital camera that is to photograph the at least one surface, the digital camera being mounted on a moving vehicle;
    determining, based upon data received from a second velocity sensor, a velocity of the moving vehicle;
    determining a trigger rate for the digital camera based at least in part upon the distance between the at least one surface and the digital camera and the velocity of the moving vehicle, wherein the trigger rate is indicative of an amount of time between consecutive images captured by the digital camera; and
    transmitting a signal to the digital camera, the signal causing the digital camera to capture images in accordance with the trigger rate.

* * * * *